June 30, 1970  W. H. BRUENJES ET AL  3,517,603
INFUSION TYPE COFFEE URNS
Filed Feb. 6, 1968  4 Sheets-Sheet 1
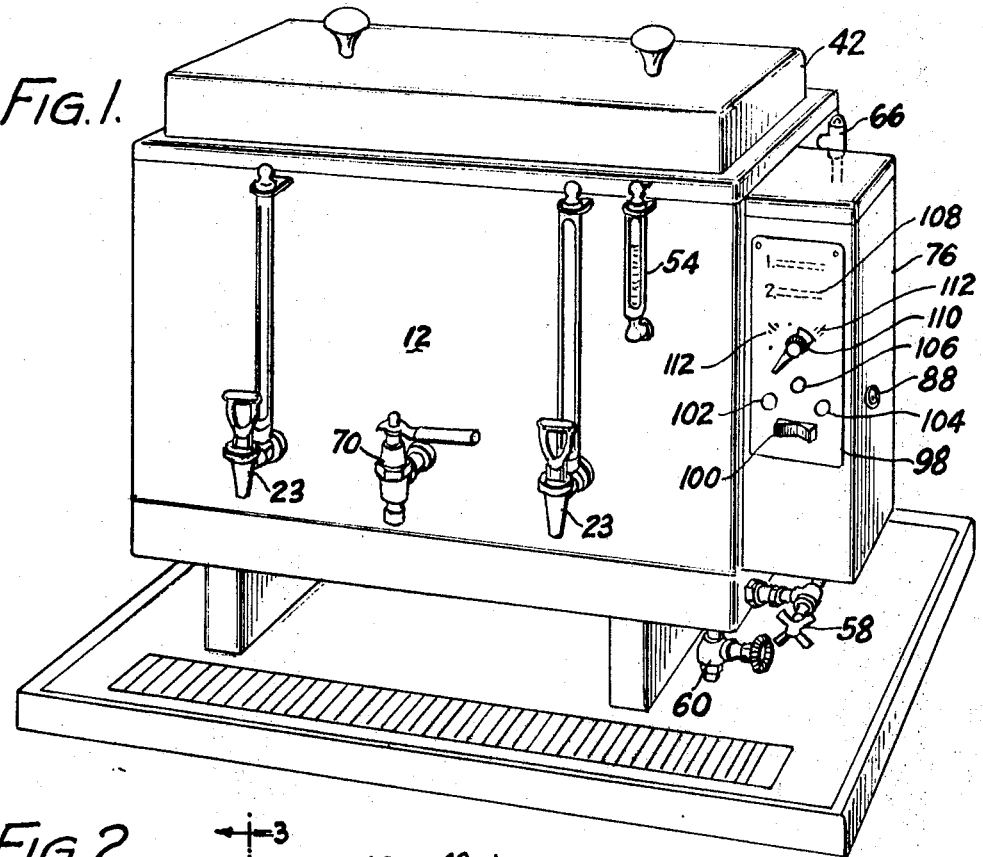
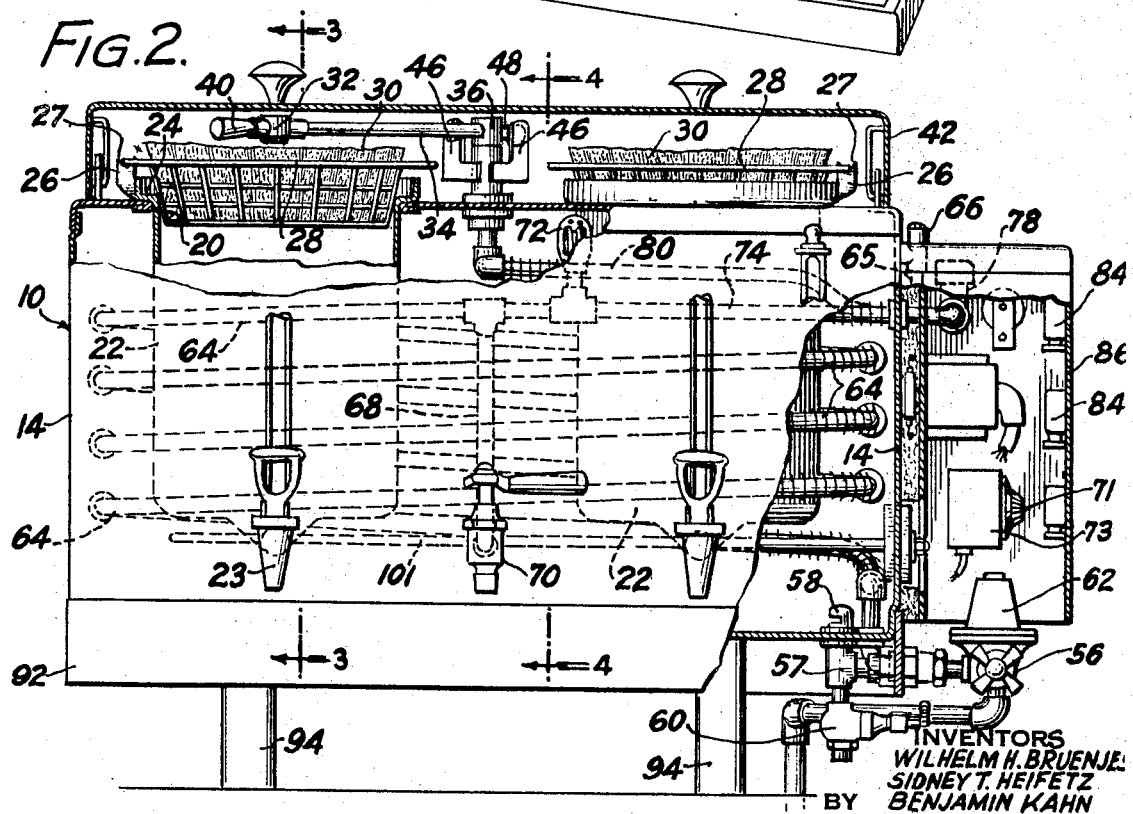
INVENTORS
WILHELM H. BRUENJES
SIDNEY T. HEIFETZ
BENJAMIN KAHN
BY
Benjamin Kahn
ATTORNEY June 30, 1970 W. H. BRUENJES ET AL 3,517,603
INFUSION TYPE COFFEE URNS
Filed Feb. 6, 1968 4 Sheets-Sheet 2

INVENTOR
WILHELM H. BRUENJES
SIDNEY T. HEIFETZ
BY BENJAMIN KAHN

Benjamin Kahn
ATTORNEY

INVENTOR
WILHELM H. BRUENJES
SIDNEY T. HEIFETZ
BENJAMIN KAHN
BY Benjamin Kahn
ATTORNEY

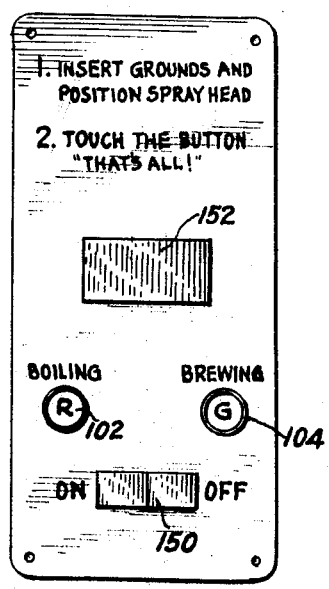
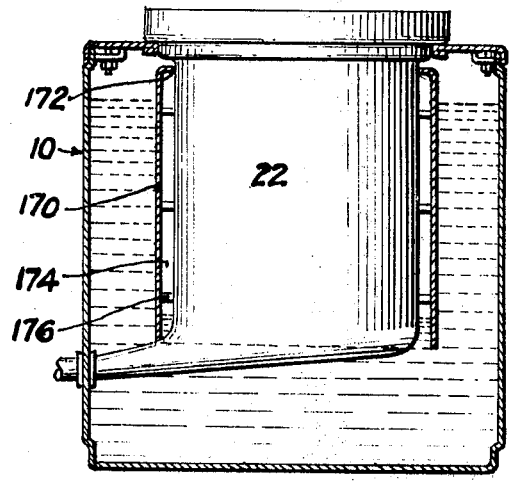
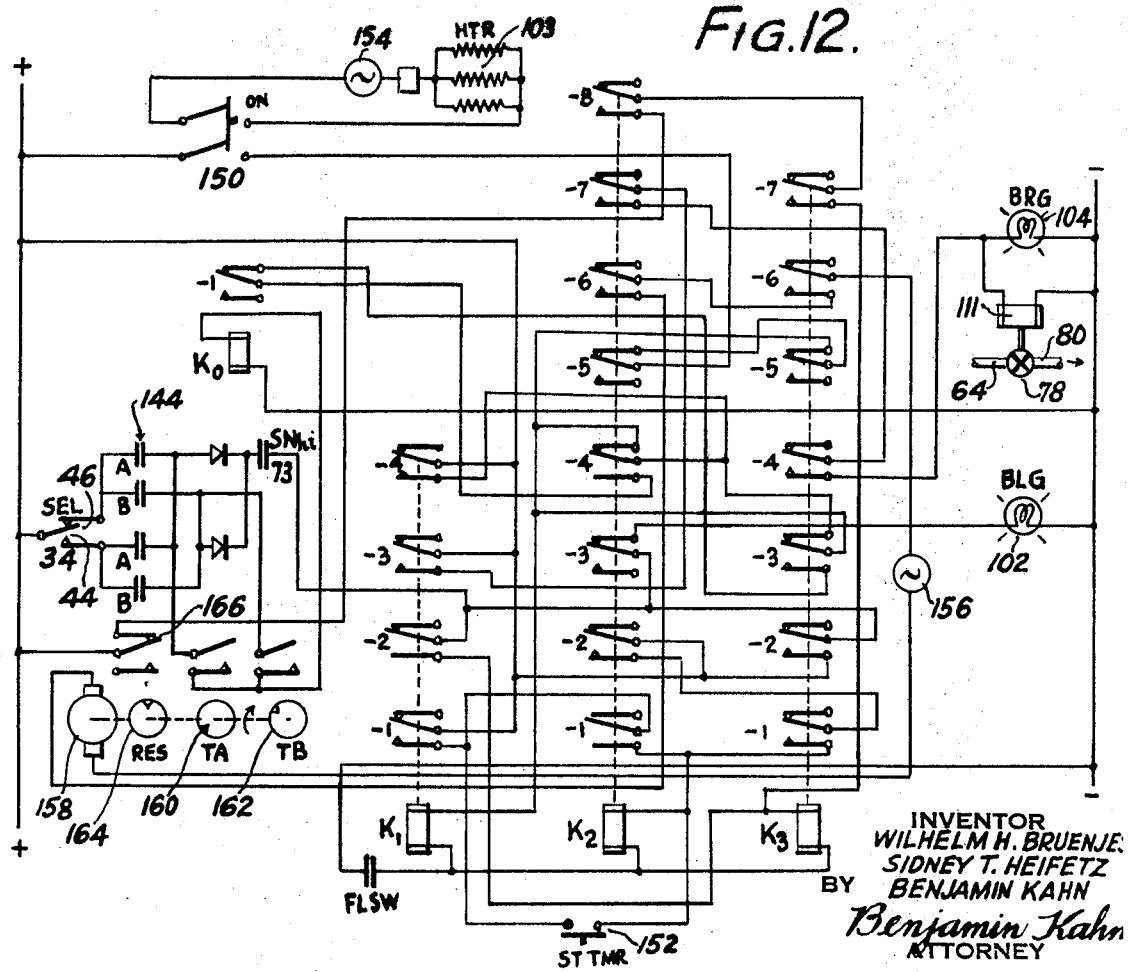

United States Patent Office 3,517,603
Patented June 30, 1970

3,517,603
INFUSION TYPE COFFEE URNS
Wilhelm H. Bruenjes, 143 Springfield Ave., Rutherford, N.J. 07070; and Sidney T. Heifetz, 1430 Parkchester Road 10462; and Benjamin Kahn, 1505 Townsend Ave. 10452, both of New York, N.Y.
Filed Feb. 6, 1968, Ser. No. 703,478
Int. Cl. A47j 31/00
U.S. Cl. 99—283                                7 Claims

ABSTRACT OF THE DISCLOSURE

An infusion type urn for consistently making liquid coffee of predetermined strength in dispensing containers in preselective full-container or fractional container batches corresponding to the particular full or fractional quantity of grounds being brewed, said urn having a vented nonpotable-water boiler-jacked surrounding a heat-absorbing potable-water coil, both jacket and coil having the same water supply source but said waters being isolated against admixture, a spray head at the outlet end of the potable water coil and disposed over the coffee grounds, a pressure reducing regulating valve located at the inlet end of the coil to provide potable hot water at constant pressure to the spray head. An electronically-operated normally-closed valve located downstream of the coil and a manually-initiatable electrical timer in an electric circuit with the valve to start and control the duration of flow of potable water required for any particular batch to produce brewed liquid coffee of predetermined strength.

---

This invention relates to infusion type coffee urns and particularly to the large, commercial, integrated twin-container, automatic water supply variety as are generally used in service mass-feeding establishments.

More particularly, this invention relates to such urns as above mentioned that brew coffee in a superimposed disposable filter and wherein full or fractional batches of coffee are brewable into the same container sequentially and or alternatingly in one or both of the containers to provide for a continuing or overlapping supply of faucet-dispensible hot, fresh coffee as the occasion demands at respective slow and busy service periods.

A major object of the invention is the provision of such above mentioned urns wherein, after certain simple manual operations are performed in the course of preparation of a selective full or fractional batch of coffee to be made in a particular container, the mere twist of a switch or touch of a button, providing certain other prerequisites had been properly performed or established, automatically initiates the brewing process only in the prepared container, and only to the extent required of an initiating full or partial batch as the case may be, to its completion—ready for dispensing—without further action or attention.

An important object of the invention is to provide simple and foolproof means to operate and control certain required functions and sequences in the process of making fresh coffee; to avoid the necessity of human judgment with its accompanying deviations and errors in evaluation of relative quantity relationships with respect to timing of the infusion process at a given rate of infusion-water feed, for the production of coffee of consistantly equal strength and flavor as optimumly chosen.

Heretofore, known coffee-brewing urns of the above types were and are of limited application and efficiency, in that they embody cumbersome elements of complex design and complicated procedural instructions for their proper operation, requiring special skill in the brewing preparation procedure, particular care and attention during the brewing process, special care and knowledge in the brewing of fractional batches and constant surveillance and monitoring for the proper maintenance of the brewed liquid held in the containers ready for dispensing.

Accordingly, it is an object of this invention to provide a fully integrated, highly compact urn of the above character having novel arrangement of its manually visible and manipulatable appliances and novel functionally cooperative components of mechanical and electrical character arranged in such manner as to provide an urn of high efficiency and dependability; of neat and attractive appearance, easily cleanable and of high internal sanitation and non-contaminating potability, of highly foolproof operation and trouble-free adaptability, yet simple in design, and manufacturable at relatively low cost.

Other objects and advantages will be seen and mentioned in the following specification, and still others will become apparent in this disclosure of some practical illustrated forms embracing the principles of the invention shown and described with detailed reference to the drawings in which:

FIG. 1 is a perspective view of one principal form of the invention.

FIG. 2 is a front view of FIG. 1, with certain walls and parts of the casing omitted and other parts broken away to show interior parts and constructions.

FIG. 10 is a front view of a control box front plate adapted for a modified twin urn with touch-button starting capability.

FIG. 11 is a fragmentary sectional view like that of FIG. 3 but of the modified unit of FIG. 10.

FIG. 12 is an electrical schematic diagram of the circuits pertaining to the unit of FIG. 10.

Figures 3, 4:
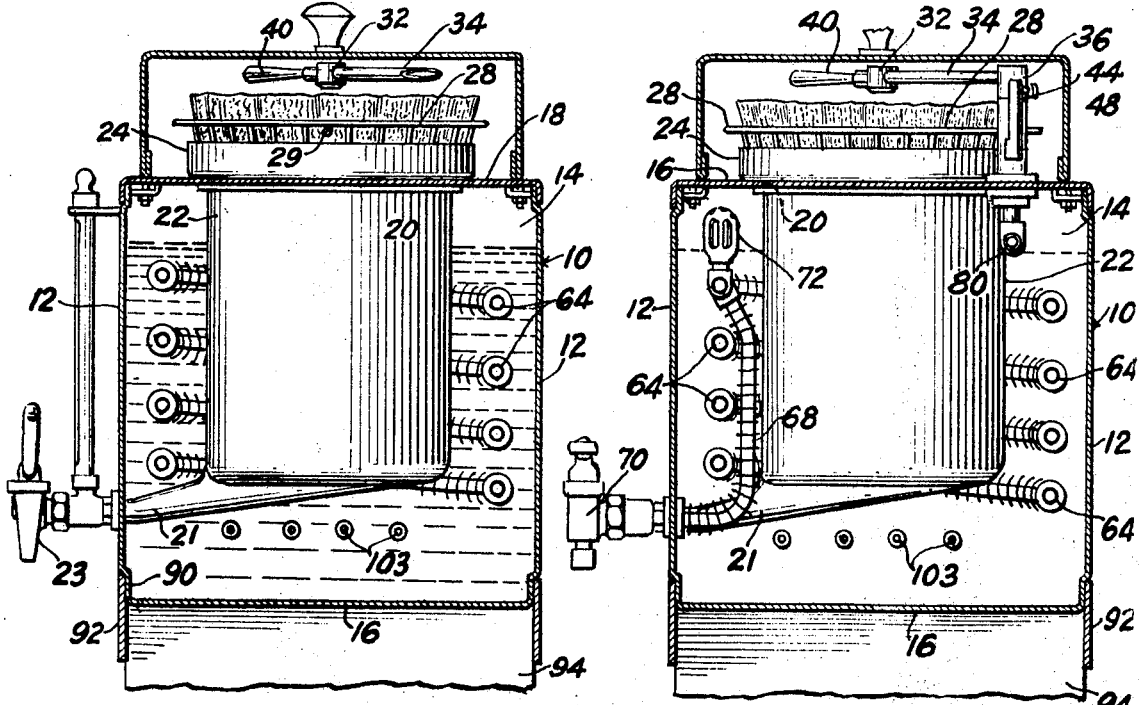
FIG. 3 is a sectional view along lines 3—3 of FIG. 2.
FIG. 4 is a section taken on line 4—4 of FIG. 3.

Referring now to FIG. 1, which shows a particular form of the invention of a simple form of the nature and capacity preferred by many mass feeding establishments. This is of semi-automatic operational character and of six gallon total capacity and composed of two three gallon containers each capable of receiving and containing a full or fractional batch produced under semi-automatic controlled manipultable eventualities as will be more fully explained hereinafter.

The construction of this unit includes an outer jacket water receptacle or boiler casing 10 comprising vertical side walls 12 and end walls 14. A bottom sheet 16 is sealed to the vertical walls to contain water therein. A top sheet 18 is removably attached to the upper portions of the end and side walls and is provided with two similar openings 20 to receive containers 22 which project downwardly into the boiler casing interior and into the boiler jacket water to substantially near the bottom thereof. These containers are provided along their bottoms with tubular nozzles 21 providing communication with faucets 23 at the front wall 12. These nozzles are provided with sealed connection through the front wall to prevent leakage of the jacket water. There is no communication between the jacket water and the interior of the nozzles.

The containers and their integral nozzles are of stainless steel or any other material adapted for retention of hot potable liquids without undue deterioration and adapted for sanitary snagless cleaning.

The containers are provided with shoulder ledges 24 extending outwardly from the container body and are adapted to bear on the top sheet 18 of the casing and along the areas surrounding the openings 20, and in this manner take support from the casing walls. Two spaced apart extensions 26, having V notches at their tops as at 27 are attached to the shoulder ledge rims of the containers and are adapted to support on one side thereof a wire basket 28 of grid construction as shown in FIG. 2. The opposite side of the basket is adapted to be supported by a spring-yieldable pin 29, the purpose of this type of construction will be fully explained hereinafter. The wire basket is adapted to receive and retain a filter cup 30 into which coffee grounds are confined before, during and after the infusion process. The fresh dry grounds preferably come in prepared packaged quantities by weight or volume as desired by the user and each package serves as the basis for the amount of liquid coffee a given package is required to produce depending upon what the user desires as his optimum. The package sizes are generally designated by the amount of consumable liquid the package produces and is generally expressed "full" or any simple fraction of the total capacity of the container, such as ½, ⅓, or ⅔, namely, "half," "one-third" or "two-thirds." The packages are marked accordingly, or may be marked by weight in corresponding ounces or pounds. In a "twin five" unit the preferred markings and reference terms may be in gallons as fractions of the total capacity of a container such as "one-gallon," "two-gallons," etc.

A spray head 31 is adapted to spread hot water, when fed it, over the prepared grounds in the filter cup 30. This spray head is carried by a tubular arm 34 which projects from a swivel hub 36. This hub is hollow and is seal journalled in a bushing 38 on the top shell 18 of the casing 10. A suitable handle 40 projects from the spray head 30 to enable an operator (when the cover 42 is raised or removed) to swing the spray head to a position over the middle of one or the other of the baskets, ready for spraying. The arm may of course be positioned between containers to permit unobstructed manipulations necessary in the course of preparing a brew and during the removal of a filter cup with spent grounds.

Switches 44 and 46 are adapted to be engaged by a finger 48 on the swivel hub 36 when the spray head is in proper middle position over one or the other of the baskets, thus cooperating in the establishment of the initiation of the feed of hot water to the prepared basket, providing dry grounds, are present therein, as required in this form of the invention described as well as in other forms to be herein shown and described later. This feature of rendering the process inoperative upon failure to supply fresh grounds is not absolutely vital because no waste or damage results. All that occurs is a hot water rinse of the subject container and a loss of some time.

Referring more particularly, now, to FIGS. 3 and 4, the fresh water supply pipe 50, through a T 52, provides water to the interior of the boiler casing 10, i.e., the boiler jacket space exterior of the containers 22. This boiler water level is preferably near the top sheet 18, substantially midway of the sight glass 54. This level is easily achieved and maintained by manipulation of the casing supply valve 56 in the water supply line from the T 52 to a slotted fitting 58, in open communication with the interior of the casing 10. The bottom run of the T 57 in the line to the slotted fitting is connected to a drain valve 60. The liquid level of the jacket water is raised by opening the valve 56 and lowered, or the jacket drained by opening the valve 60.

The other outlet leg along the run of the T 52 is connected to a pressure reducing valve 62 which is adapted to maintain a lowered but constant pressure in a coil 64 mainly immersed in the water in the boiler jacket space above referred to. The space in the casing 10 above the jacket water level is open to the prevailing atmosphere by means of a T-like vent pipe 66 the upper run of which is perforated and the lower run of which is connected to a downgoing pipe 65 terminating near the bottom of the unit to avoid splashing of any overflow issuing therefrom. Any excessive issuance of steam like vapor through the perforations is readily apparent and is an indication that the jacket water is boiling too rapidly and should be tempered to prevent too rapid loss of jacket water to no avail.

Thermoset sensing and control means 69 includes a setting knob 71 to set the high temperature zone to signal and limit the "boiling" temperature of the jacket water or, as the case may be, to limit the rate of boiling vaporization depending upon the elevational location of the unit. A similar setable control means 75 for a lower-than-boiling, a "holding," temperature, includes a knob 77 and a "holding" temperature sensor 81. This control is adapted to increase the temperature of the jacket water should it fall below a predetermined set point.

It has been generally recognized that better coffee is brewed with the spray water at around 204° F. than 212° F. SBT (standard boiling temperature), i.e., about 7 degrees or so, below the particular boiling point is most preferred. The coil 64 in the jacket water is preferably of finned copper tubing and of high heat conductivity. The length of the tube is such that water in the coil entering at below room temperature is capable of being heated to aroung 204° F. by the time it reaches the spray head, at the preferred rate of flow. This balance is achieved by adjustments of the pressure regulator 62 and the control knob 71.

At the top convolution of the coil 64, near the outlet end thereof, the coil tube is provided with a branch connection leading to a short vertical run of finned tubing 68 which is suitably sealed where it passes through the casing and outside thereof to a handle type faucet 70, from which, clear, clean, hot water may be drawn off. Near this branch take-off point, the coil 64 is also connected to a safety valve 72 set at a blow-off pressure slightly higher than that set for the outlet of the pressure reducing valve 62. This safety valve is completely confined within the casing 10 and therefore, should it blow, the escaping hot water and escaping vapor is confined within the casing, thus merely raising the level of the jacket water without harm. Upstream of the safety valve, a section of the finned coil tubing passes through one end wall of the casing in a sealed manner, and enters into the control box 76 which is suitably secured and insulated therefrom. In the control box the water circuit continues through suitable fittings and pipe including a normally closed solenoid operated valve 78. The outlet of this valve is directed back into the casing in a similar manner as at the inlet where it is connected by a short run of tubing 80 to the swivel bushing 36 and consequently to the spray head 32.

In order to prevent the automatic initiation of the brewing process by the opening of the normally closed valve 78 prior to the cold water in the system having reached the proper temperature required to issue from the spray head as above explained, the thermostatic sensor switch 73 is adapted to complete its circuit when this preselected operating temperature has been reached, at which time the temperature of the potable water inside the coil will have reached the desired spray issuing temperature. This circuit is so arranged, as will later be seen and described, that once the spray cycle is initiated for an instant particular batch being brewed, it continues uninterruptedly to issue the corresponding proper quantity of potable hot water as prescribed and preset for the batch. The circuit is also so arranged, that should there be an excessive undesirable lowering of temperature at the high, close to boiling level, necessarily required for spray issuance, maximum heater application conditions are established in the circuitry to increase the temperature of the jacket water, and consequently increase the coil water temperature.

The control box also contains a plurality of programmable switching relays 84 of multiple contact character that are mounted on the cover for easy access when the cover is disposed in open position, exposing these devices, their cables, electrical harnesses and connections.

Under normal operating circumstances the cover is preferably locked in place by suitable interengaging means, not shown, cooperating between the cover and the body of the box and under prevailence of a key lock mechanism generally designated as 88 on the face of the cover. This method of enclosure of relays and other presettable means and elements not required for manipulation under repeated normal operations in brewing a batch, is to prevent unauthorized tampering or changing the settings arrived at for optimum selected operation. Manually manipulable buttons, knobs and handles necessary in the cleanout procedure of a spent batch and the processing of a fresh batch are readily accessible from the outside of a closed control box 76.

Along the bottom of the side walls 12 and continuing along the bottom of the ends walls, and fitting a ledged recess as at 90, is a continuous ornamental as well as bracing strip 92 depending below the bottom of the casing bottom sheet 16. Hollow oblong supporting members 94, on edge, art attached to the bottom sheet 16 and are adapted to carry the load of a completely filled unit upon a table, counter or other supporting surface. These supporting members 94 are disposed parallel to the ends of the casing and spaced similarly, substantially inward of the said end walls to reduce the mid-span of the unsupported sheet bottom 16 and thus more evenly distribute the load along the bottom sheet.

The height of the oblong suppporting members 94 is preferably quite substantial in order to permit the reception of tall caraffes under the faucets 96, but their ungainliness and instability due to this height is reduced by the structural and ornamental apron-like band construction when welded together.

The front face of the control box 76 is provided with a plate 98 on which operating instructions and other legendary matters appear. The said front face and the said plate are also provided with suitable corresponding holes and openings through which mechanical and electrical components and signalling devices project from their attachments and connections inside the control box. Included in these projected devices is a three-way manually operable switch 100 of the "on-off-on" walking beam variety. One "on" position is adapted to start up the heating of the jacket water of the unit by energizing the electrical heating elements 103 that are immersed in the jacket water. This mentioned "on" position is in circuit with the high or "boiling" control sensor 73 governing. Whereupon, at reaching "boiling" temperature the light 102, red in color, becomes lit, indicating to the operator that the brewing cycle may properly be initiated.

Figure 6:
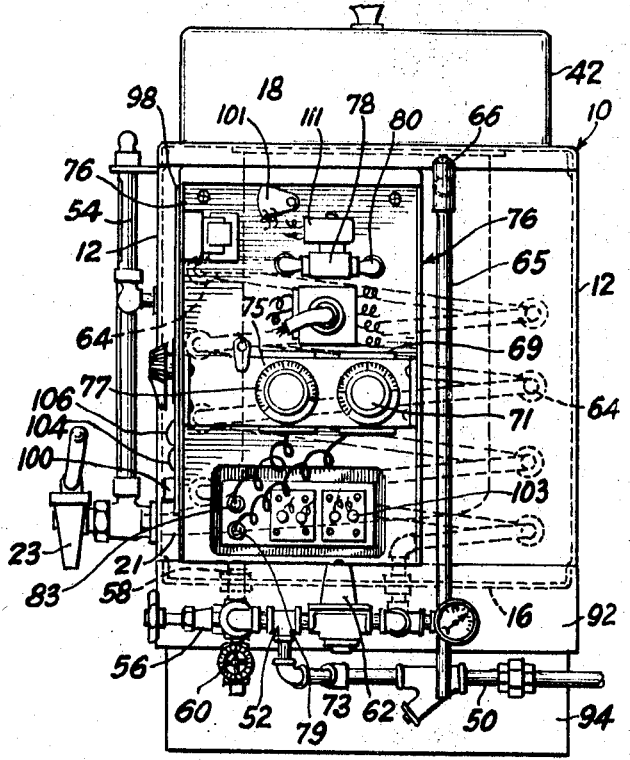
FIG. 6 is an end view of the form shown in FIG. 1 with its control box cover removed and with certain portions of the casing broken away to show parts of the interior more clearly.

At the completion of the brewing cycle and upon throwing the switch 100 to the other "on" position the switch is adapted to establish a prevailing the lower-than-boiling "holding" temperature as regulated by the control means 75 in conjunction with its sensor 81 in the thermowell as at 83 (see FIG. 6) during which period an amber light 104 is lit. This light is labeled "HOLDING." During the brewing cycle, a green light 106 labeled "BREWING" is lit and likewise, when the boiling or high temperature conditions prevail the red light 102 and labeled "BOILING" is lit, as will clearly be seen in the circuit diagram soon hereinafter to be more fully described.

The enumerated operating instructions are simple and in the instant described form, are substantially as follows:

1. INSERT GROUNDS AND POSITION SPRAY HEAD
2. SET TIMER KNOB. "That's all!"

These instructions appear at 108 on the front plate 98, see FIG. 1. The timer knob 110 referred to is also best seen in FIG. 1, and is associated with radial marks 112 signifying full and as desired any preferred fractional batch timer-setting points.

Figure 5:
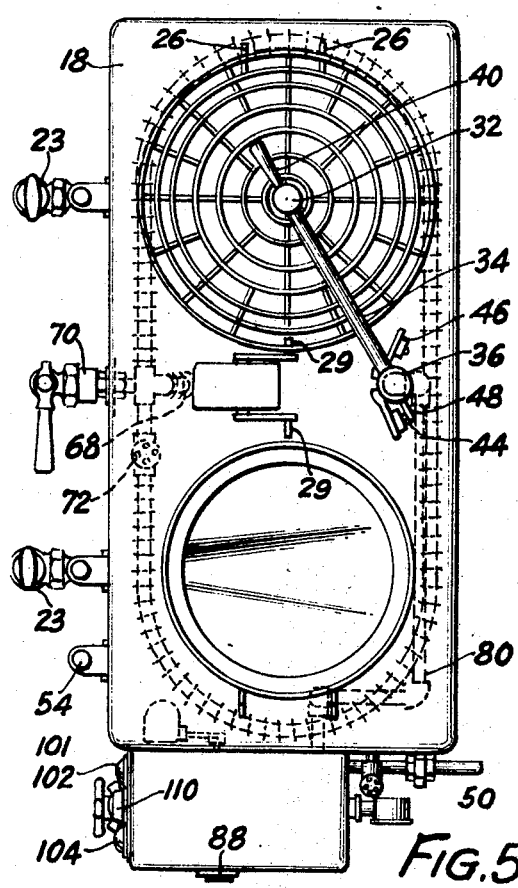
FIG. 5 is a plan view of the form shown in FIG. 1 with the cover removed.
Figure 8A:
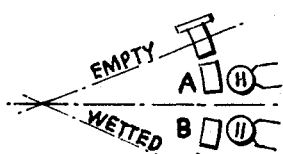
FIG. 8a is a schematic view of a modified form of reed relay switch arrangement wherein automatic brewing timing for substantially ⅓, ⅔ and full batch brewing is entailed.
Figure 8B:
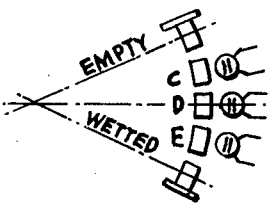
FIG. 8b is a view similar to FIG. 8a but with a switch responding arrangement wherein automatic brewing timing for ¼, ½, ¾ and full batch brewing is entailed.
Figure 8C:
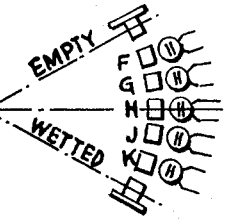
FIG. 8c is a further similar view to that of FIG. 8b and adapted for automatic selective timing for ⅕, ⅖, ⅗, ⅘, and full batch brewing.
Figure 8:
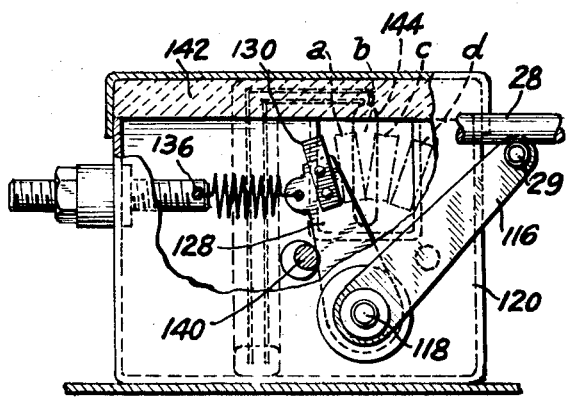
FIG. 8 is an elevational view substantially along the line 8—8 of FIG. 5 of a switch box containing mechanism and reed relays responsive to the varying weight of wet or dry grounds in the baskets of the above described form of the invention wherein manually selective timing is entailed.

Referring to the FIGS. 2, 5 and 8 it is to be noted that the notches 27 on the baskets supports 26 constitute fulcrums, allowing the opposite side of the rim of the baskets to reflect the varying load of empty to full baskets. Thus any support at points opposite the fulcrums are subject to corresponding varying loads. These loads are born by the finger pins which project outwardly from external arms 116 attached to journal pins 118 independently rotatable in opposite walls of the switch box 120, having a central wall 122. Since the function and construction is substantially identical on either side of this central wall, except for respective opposed disposition, further description will be of one side and its coation with its respective basket.

Secured to the journalled pin 118, on the inside of the box 120, is an arm 128 having a magnet 130 attached to the other free end thereof. A hole 132 near this free end is adapted to engage one end of a tension spring 134. The other end of this spring is engaged at 136 to an adjustable screw anchor 138 adapted to vary the tension of the spring against an adjustable initial stop 140 for the arm 128. Weight on the rim 28 is reflected as load upon the pin finger 29 and causes a clockwise rotation of these arms 116 and 116, with corresponding rotation of the magnet 130 from its home position as shown best in FIG. 8.

Figure 9:
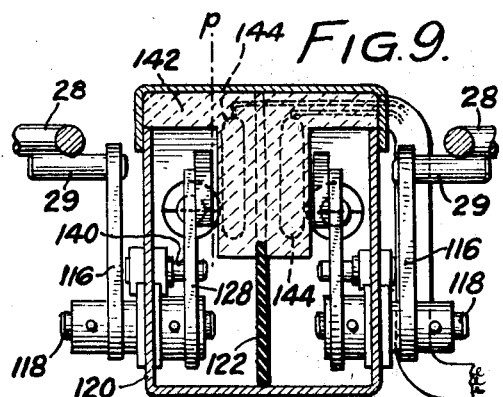
FIG. 9 is an end view of the switch box shown in FIG. 8, with front parts of the box broken away to show interior parts more clearly.

Inside the box 120, and depending from the cover in a hermetically encapsulated member 142, is a vertically disposed "reed" relay 144, disposed in plane close to the plane *p*, the plane generated by the path of movement of the magnet 130 as seen in FIG. 9. The disposition of the "reed" relay as seen in FIG. 8 is such that in the initial position of the magnet the relay is angularly spaced therefrom a sufficient distance that the magnet has no influence upon the reeds inside the relay. The contacts of the "reed" here employed are normally open and are closable when close proximity within preset limits are achieved. However, with the magnet in the position *a*, as would result from a quantum or fractional package of dry grounds in the filter in the basket, the reeds come under the influence of the magnet in such shown proximity would make contact and close the circuit therethrough. Should two of such packages of dry grounds be placed in the basket, the position is advanced clockwise and the magnet is in balance substantially at the central position *b* where the reeds would still be under magnetic influence and in contact. With three packages in the basket (a full batch quantum), the magnet will be located substantially at the position c with the reeds still in contact, thus keeping the circuit closed throughout the incidence of response to full or fractional quantums of dry grounds in the basket.

After a brew is started, of a full or fractional batch, and upon failure to remove the wet grounds residue thereof, a succeeding improper attempt at initiation of the spray by turning the timer, or pressing a button as the case may require, to start the brew under such circumstances cannot be accomplished, because, the magnet 130 will have reached the position d, even with the smallest fractional batch of wetted grounds, and the reed contacts will be in the open position. Therefore, with the above described electro-mechanical means the brewing cycle cannot be initiated with an empty basket or one with wetted grounds.

Figure 7:
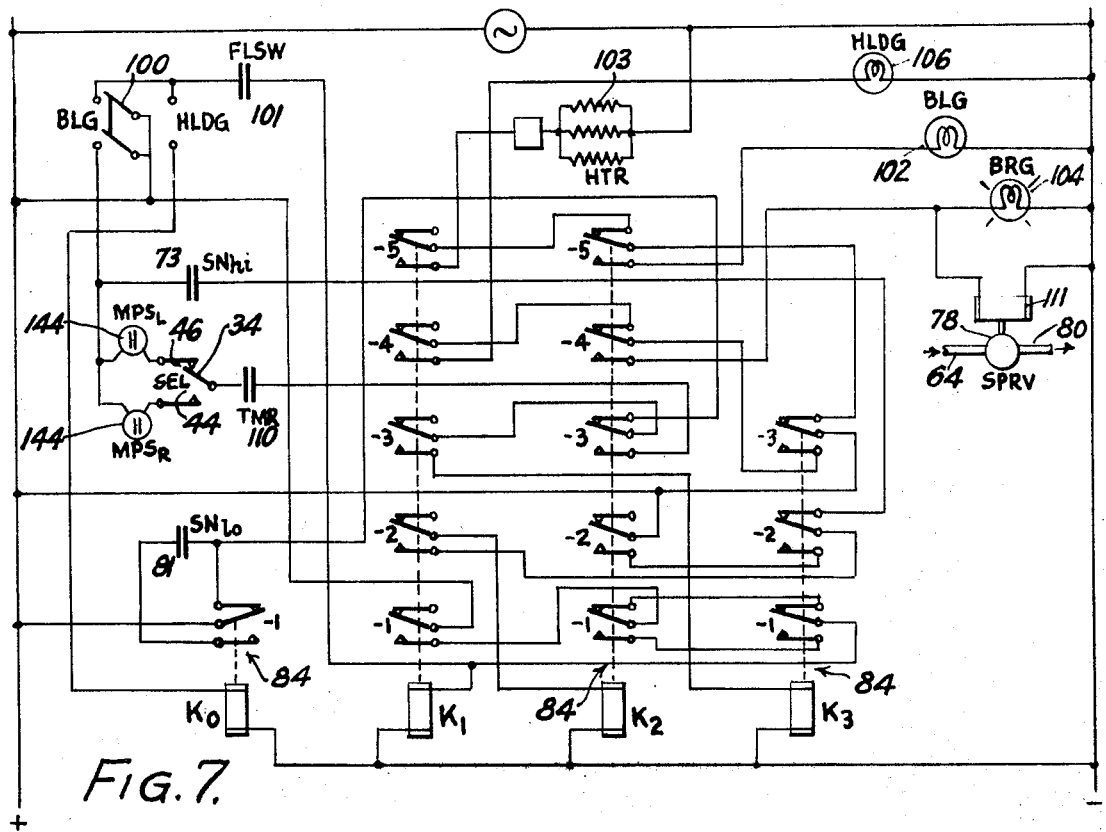
FIG. 7 is an electrical schematic diagram of the circuits pertaining to the form shown in FIG. 1.

Referring now more particularly to the electrical circuit diagram FIG. 7, a positive source of potential is designated as plus (+) and negative source minus (−); the diagram in the instance shown is in the non-operating state with the switch 100 in the "off" position. The relays 84 labelled $K_0$, $K_1$, $K_2$ and $K_3$ are of the multiple pole double throw variety, the armatures of which are ganged and normally disposed in the up position as shown and in contact with the upper of the two contacts.

Upon starting in the morning, for example, and upon closing of the "on" contacts BLG of the switch 100, and providing the float switch 101 (FLSW) in series therewith is closed, the relay $K_1$ is energized, and its armatures at $K_1$-1, $K_1$-2, $K_1$-3, $K_1$-4 and $K_1$-5 are drawn down to make contact with their respective down contacts. Through down contact at $K_1$-5, up contact $K_2$-5 and up contact $K_3$-3 the circuit of the heater 103 (HTR) is completed. When the temperature of the jacket water reaches the high zone, the sensor 73 (SN$hi$) closes its contacts causing relay $K_2$ to be energized through $K_3$-2 up contacts and $K_1$-2 down contacts. Should the jacket water temperature fall below the high temperature zone, then the Sn$hi$ contacts open, causing relay $K_2$ to be de-energized, thus re-establishing the circuit to the heaters HTR.

These foregoing electrical circuit events repeat cyclically to keep the temperature of the jacket water up to the high or boiling level and ready for the manually initiative action to start the spray, as by means of setting the timer as shown and described or by touching a button as will be herein shown and described in another modification of the invention.

Upon activating the timer TMR 110, and through its closed contacts, a circuit is established $K_2$-3 and $K_1$-3 energizing relay $K_3$, whereby current is established through $K_2$-4 down contacts, $K_3$-3 down contacts, thereby energizing the solenoid 111 of the spray valve 78 (SPRV) opening communication to spray head 32 of the water in the finned tubing coil 64, which at the same time lights the "brewing" lamp 104 labeled BRG. At the completion of the interval to which the timer TMR 110 was manually set, i.e. the time for it to return to its initial home position whereupon the timer contacts are opened, thus interrupting the current to relay $K_3$, resulting in a return to the circuit state previously described, where the high temperature boiler jacket state is cyclically maintained.

After the brew is substantially completed, and it being desirable to maintain the liquid coffee at a temperature in the "holding" temperature range, the operator throws the "on-off-on" switch 100 to holding (HLDG), electrically engaging these contacts, energizing the relay $K_0$. This establishes a circuit through $K_0$-1 down, through the low temperature sensor 81 (SN$lo$), $K_2$-3 up contacts, $K_1$-3 down contacts, thus energizing $K_3$ relay. This in turn establishes a circuit through the holding light 106 of amber color and labeled HLDG, through $K_3$-3 down contacts, $K_2$-4 up contacts, and $K_1$-4 down contacts.

When the temperature of the jacket water falls below the threshold established by SN$lo$, its contacts are open and relay $K_3$ becomes de-energized. $K_1$ relay being energized and relay $K_2$ being de-energized re-establishes the HTR circuit via $K_1$-5 down contacts, $K_2$-5 up contacts and $K_3$-3 up contacts, thus heating the boiler jacket water until the SN$lo$ contacts are again made, whereupon, the relay $K_3$ is again energised through $K_0$-1 up contacts, and $K_1$-3 down contacts. With the switch 100 on HLDG and the jacket temperature falls below the set SN$lo$, the heater goes "on." When the upper limit of SN$lo$ is reached the heater goes "off" creating a repetitive "holding" cycle as described.

The relays for ordinarily providing the current gain necessary to drive the heavier loads of certain pieces of equipment, such as the heaters and the spray solenoid, have been purposely omitted for simplicity.

The hermetically sealed magnetic-responsive proximity switch 144 (MPS) of which there are two shown in the electrical diagram of the twin container unit chosen for descriptive example, are labeled $MPS_L$ and $MPS_R$ representing respectively, the switches associated with the left and right containers or, more particularly, with the left and right baskets disposed thereover. These switches pass current to the timer 110 only when one or another is selected manually by positioning of the selector switch 34 (SEL) and further, only if the basket of the MPS selected contains a quantum of dry coffee grounds. The timer circuit to initiate the spray as above described, will also not function should the filter selected have wetted grounds or no grounds, or that the spray head is over the wrong basket or improperly positioned over a properly prepared basket.

Referring now to FIGS. 10, 11 and 12, particularly related to a modified form of urn which is of the general character of that previously described except that the "holding" temperature feature thereof is eliminated, and also, the manually setable timer for initiating the spray function is replaced by a touch-button switch relay that requires no manual time-selective setting, the time interval for the duration of the spray function being automatically selected among a plurality of pre-selected time intervals each corresponding to the fractional of full quantum of the dry grounds subject to brewing. The instruction plate in this modification is provided with holes and openings to present for manipulation or display on the front face of the control box an "on-off" switch 150 similar to the switch 100, the same type of "red" light 102 marked "BOILING," and a "green" light 104 marked "BREWING." No "HOLDING" light is used.

A touch-button switch 152 replaces the timer knob 110, and the enumerated instruction 1., the same as before, whereas that enumerated 2., now reads as follows:
2. TOUCH THE BUTTON. "That's all!"

In this form of the invention, the magnetic proximity reed relay switch assembly is of the character of that shown in FIGS. 8a, or 8b, or 8c, depending upon the particular size and fractional batch adaptation chosen to prevail, namely, 8a for an ⅓ and ⅔'s fractional type, 8b for the ⅓, ½, and ⅔'s fractional type, and 8c where one to five gallon fractions are the preferred brewable batch divisions.

Referring to FIG. 11, a skirt 170 open at the bottom and seal connected to the container as at 172 to provide an inverted bucket type air trap therein to provide an insulating air space as at 174 to reduce the rate of heat transferable between the boiler water and the container and therefore maintainable within the acceptable range for "holding" temperature purposes. A suitable number of stand-off studs 176 are disposed between the skirt and the container 22 to modify the heat transfer rate to a preferred optimum.

Referring particularly to FIG. 12, the circuit condition as shown is "off," that is, ready to start. The heaters are "off" and by making the switch 150, the heaters are turned "on" through an independent alternating current supply 154. Through another set of contacts on the switch 150, the relay $K_1$ is energized via $K_2$–5 up contacts, $K_3$–5 up contacts, through the FLSW 101 contacts, providing the water is up to level. Should the jacket water level be below that necessarily required, as set, the heater cannot be turned "on." With the heater "on," relay $K_3$ is energized by completion of a circuit from the minus (−) lead through $K_1$–2 down contacts, ($K_1$ relay being energized) through SN*hi* contacts, through one level-controlling reed switch 144A or 144B of one or the other containers, providing of course the selector switch 34 (SEL) of the swingable spray arm is properly positioned over the basket having the dry grounds and having activated one of the said reed switches. At the same time the BLG (boiling) signal light 102 is lit via contacts $K_2$–3 up contacts which are also in circuit through the SN*hi* contacts and the reed relay circuits just above mentioned. This light indicates to the operator that the brewing cycle may be begun by touching the start button 152.

When this is done the $K_2$ relay is energized via $K_1$–1 down contacts. This activates the green "brewing" light (BRG) 104 and the spray solenoid 111, opening the valve to the pressurized flow of hot potable water to the properly positioned spray head 32 by completion of the electrical circuits via down contacts $K_3$–4, down contacts $K_2$–7 and the down contacts $K_1$–3. At the same time the red "boiling" light 102 (BLG) goes "off" upon energization of relay $K_2$ and the corresponding opening of the up contacts $K_2$–3. A separate alternating-current circuit for activating the timer 158 is completed through the source 156, $K_2$–6 down contacts and $K_3$–6 down contacts. The timer 158 is provided, in this instant example, with three discs; a short time disc 160 (TA) setable to the chosen optimum timing of flow of potable hot water for, say, a half-full batch, a similarly setable time disc 162 (TB) set for a chosen optimum time of flow for a full batch, and a timer reset disc to control the stop and start positions of the shaft of the timer and discs.

The contacts to each of the discs is provided with latch type circuits, not shown but well known in the electrical art, whereby these circuits are unlatched by the reset disc (RES) 164, that is, once the circuit to or through contacts 144A or 144B is initiated such circuit is maintained until reset, and therefore, any increase in weight due to subsequent wetted grounds will not affect or interrupt the first established and initiated circuit through a particular reed switch controlling the latched in start of an initially selected and governing timing disc.

At the timer end signal of TA or TB, relay $K_0$ is energized. Relay $K_0$ being in series with circuit holding relay $K_1$ energized, $K_1$ is therefore de-energized. This opens the circuits to the spray solenoid 111 and to the BRG light as above explained.

When the timer reset signal is reached, contacts 166 are opened thus opening the circuit holding $K_3$ relay via $K_2$–8 and $K_3$–7. The timer rotation is also stopped at its index position via contact $K_3$–6 in the alternating-current circuit 156. Relay $K_2$ was held energized through relay $K_3$ via $K_2$–1 and $K_2$–2, therefore, when relay $K_3$ becomes de-energized, as a result, $K_2$ also becomes de-energized. At this stage all relays are de-energized and the starting conditions are re-established as in the beginning of this electrical operative explanation.

Having thus described the principal preferred forms of the invention it is seen that many modified variations thereof may be had without departing from the embracing principles as defined in the claims.

What we claim is:

1. In a coffee urn of the character described, the combination of a boiler jacket open to atmosphere and providing a reservoir of non-potable hot water, an open top container for receiving the potable drip-liquid product of infused coffee, means for holding the infusible coffee grounds over said container, a tubular heat absorbing coil containing water isolated from said reservoir water, is immersed in said reservoir whereby the potable water inside the coil is heated by induction to a temperature substantially that of the boiler jacket reservoir water, said coil being connected at its inlet end to a water supply source at a given pressure, adjustable means at the inlet end of said coil for reducing the pressure inside the coil to an optimum and constant pressure lower than that of the said supply source, a spray head disposed over the coffee grounds holding means and having communication with said coil at the outlet end thereof, a normally closed electrically operable valve immediately downstream of said coil and immediately upstream of spray head, and manually operable timer means in an electric circuit adapted to open and hold open said normally closed valve for a preset period of time, whereby at said reduced and constant pressure, a prescribed quantity of hot water issues from the spray head to the infusible coffee grounds during the preset period of time.

2. A coffee urn as set forth in claim 1 which includes, means for establishing said electric circuit in response to the presence of dry grounds in said means for holding said dry grounds, and for preventing the establishment of said electric circuit in the absence of said dry grounds.

3. A coffee urn as set forth in claim 2 which includes, means to render inoperative said establishable electric circuit while saturated grounds is in said means for holding grounds.

4. In a coffee urn of the character described, the combination of a boiler jacket open to the atmosphere and providing a reservoir of non-potable hot water, a pair of open top containers for receiving the potable drip-liquid product of infused coffee, separate and independent means for holding infusible coffee grounds over their respective containers, adjustable electrothermostatic means for sensing the temperature of said jacket water and adapted to close an electric circuit upon reaching a preset temperature, a tubular heat-absorbing coil immersed in said hot water reservoir whereby potable water inside the coil is heated by induction to a temperature substantially that of the boiler jacket reservoir water, said coil being connected at its inlet end to a water supply source at a given pressure, adjustable means at the inlet end of said coil for reducing the pressure inside the coil to a constant pressure lower than that of the supply source, a manually swingable spray head adapted to be selectively positioned over either one of the means for holding infusible coffee grounds, said spray head having communication with said coil at the outlet end thereof, a normally closed electrically operable valve in said coil at the outlet end thereof and upstream of the spray head, said valve being in circuit with said electrothermostatic means, and manually operable presettable timing means in an electric circuit including said electrothermostatic means and adapted to open and hold open said normally closed valve, only when set temperature of water is reached, for a preset period of time, whereby a prescribed constant quantity of hot water, at preferred preset temperature, passes the spray head to the selected infusible coffee grounds holding means during the preset period of time.

5. In a coffee urn of the character described including a boiler jacket for containing boiling water surrounding a container for receiving the drip-liquid product of infused coffee, the combination of means for holding grounds over said container, means establishing an electric circuit in response to the presence of dry grounds in said means for holding grounds, a tubular heat-absorbing coil substantially immersed in said water in said boiler jacket, said coil being connected at its inlet end to a water supply reduced to a predetermned constant pressure, a normally closed electrically operable valve in said coil and near the outlet end thereof, said coil terminating at its outlet end in a spray head positionable over the said means for holding the grounds, a manually operable switch means in circuit with said normally closed electrically operated valve to open and hold open said valve for a predetermined period whereby a prescribed quantity of hot water is supplied to the said spray head, and means rendering said circuit inoperative upon absence of grounds in the said grounds holding means.

6. In a coffee urn of the character described including a vented boiler jacket for containing boiling water and surrounding a container for receiving the drip-liquid product of infusible coffee grounds, the combination of means for holding infusible grounds over said container a common water supply source of varying pressure, a tubular heat-absorbing coil substantially immersed in the water in said boiler jacket, the water in said boiler jacket being isolated from the water in said coil, an adjustable pressure reducing valve connected at the inlet end of the coil and reduced to a predetermined constant pressure lower than the source of supply water, a normally closed electrically operable valve in said coil and located at the outlet end thereof, said coil terminating at its outlet end in a spray head disposed over said infusible coffee grounds, a manually operable electrical contact means for initiating the opening of said electrically operable valve, and thermostat control means preventing the initiating of said circuit until said boiler jacket water reaches a predetermined temperature.

7. A coffee urn as set forth in claim 6 which includes means for establishing said electric circuits in response to the presence of dry grounds in said means for holding grounds, said circuit establishing means for rendering said circuits operative adapted to function within a prescribed range of weight of the contents in the means for holding grounds and rendering said circuit establishing means inoperative when the said range limit is exceeded.

References Cited

UNITED STATES PATENTS

| 2,565,235 | 8/1951 | Johnson | 99—291 X |
| 2,748,689 | 6/1956 | Rotman | 99—283 X |

ROBERT W. JENKINS, Primary Examiner

U.S. Cl. X.R.

99—285, 291, 305, 307